(12) United States Patent
Postier et al.

(10) Patent No.: US 10,710,067 B2
(45) Date of Patent: Jul. 14, 2020

(54) PIPETTE TIP WITH INTEGRATED LIGHT GUIDES IN THE BODY AND METHOD OF SPECTROSCOPIC ANALYSIS USING SAME

(71) Applicant: Spectrum Perception LLC, St. Charles, MO (US)

(72) Inventors: Bradley Lynn Postier, St. Charles, MO (US); Thomas Michael Spudich, Jr., Lake St. Louis, MO (US)

(73) Assignee: Spectrum Perception LLC, St. Charles, MO (US)

( * ) Notice: Subject to any disclaimer, the term of this patent is extended or adjusted under 35 U.S.C. 154(b) by 0 days.

(21) Appl. No.: 15/813,893

(22) Filed: Nov. 15, 2017

(65) Prior Publication Data

US 2018/0126371 A1 May 10, 2018

Related U.S. Application Data

(63) Continuation-in-part of application No. 15/113,648, filed as application No. PCT/US2015/012787 on Jan. 23, 2015, now Pat. No. 10,345,145.
(Continued)

(51) Int. Cl.
*G01N 35/10* (2006.01)
*B01L 3/02* (2006.01)
(Continued)

(52) U.S. Cl.
CPC ........ *B01L 3/0275* (2013.01); *G01N 21/0303* (2013.01); *G01N 21/253* (2013.01);
(Continued)

(58) Field of Classification Search
CPC ............ B01L 3/0275; B01L 2300/168; B01L 2300/0654; G01N 35/10;
(Continued)

(56) References Cited

U.S. PATENT DOCUMENTS 3,200,650 A 8/1965 Morrill, Jr.
5,257,086 A 10/1993 Fateley et al.
(Continued)

FOREIGN PATENT DOCUMENTS

WO 2010027982 A2 3/2010
WO 2015112919 A2 7/2015
WO 20160156051 A1 10/2016

OTHER PUBLICATIONS

International Search Report, International Patent Application No. PCT/US20151012787, dated Apr. 17, 2015, 14 pages.
(Continued)

*Primary Examiner* — Hwa Andrew Lee
(74) *Attorney, Agent, or Firm* — Lewis Rice LLC

(57) ABSTRACT

Novel disposable pipette tips that enable spectroscopic analysis of analytes held within the tip while attached to a microspectrometer or microspectrometer which is a micropipette with the functional capability to irradiate an attached tip with light of a defined wavelength and measure the impact of the sample within the tip on the irradiated light as the modified light is directed back to sensors on or within the instrument. Spectroscopic sample analysis is integral to a wide range of research sciences including microbiology, molecular biology, medical, chemistry, environmental, food, and forensics.

4 Claims, 9 Drawing Sheets

Related U.S. Application Data

(60) Provisional application No. 62/422,441, filed on Nov. 15, 2016, provisional application No. 61/930,684, filed on Jan. 23, 2014.

(51) Int. Cl.
- *G01N 21/25* (2006.01)
- *G01N 21/85* (2006.01)
- *G01N 21/03* (2006.01)
- *G01N 21/51* (2006.01)

(52) U.S. Cl.
CPC ......... *G01N 21/8507* (2013.01); *G01N 35/10* (2013.01); *B01L 2300/0654* (2013.01); *B01L 2300/168* (2013.01); *G01N 21/25* (2013.01); *G01N 21/51* (2013.01); *G01N 2021/8521* (2013.01); *G01N 2035/103* (2013.01); *G01N 2035/1062* (2013.01); *G01N 2201/0221* (2013.01)

(58) Field of Classification Search
CPC ..... G01N 2035/1062; G01N 2035/103; G01N 2201/0221; G01N 21/25; G01N 21/51
See application file for complete search history.

(56) References Cited

U.S. PATENT DOCUMENTS

| | | | |
|---|---|---|---|
| 5,917,592 A | 6/1999 | Skiffington | |
| 6,013,528 A | 1/2000 | Jacobs et al. | |
| 6,416,234 B1 * | 7/2002 | Wach | G01N 21/474 385/70 |
| 6,461,808 B1 | 10/2002 | Bodner et al. | |
| 7,459,713 B2 | 12/2008 | Coates | |
| 7,907,282 B2 | 3/2011 | Coates | |
| 8,189,196 B2 | 5/2012 | Belz | |
| 8,912,007 B2 | 12/2014 | Bjornson et al. | |
| 8,940,523 B2 | 1/2015 | Follonier et al. | |
| 2001/0055115 A1 | 12/2001 | Garver et al. | |
| 2007/0081159 A1 | 4/2007 | Giffin et al. | |
| 2010/0034706 A1 | 2/2010 | Mathus et al. | |
| 2010/0167412 A1 | 7/2010 | Xiao et al. | |
| 2011/0305599 A1 * | 12/2011 | Tan | G01N 21/45 422/69 |
| 2013/0095508 A1 | 4/2013 | Campitelli et al. | |
| 2016/0245739 A1 | 8/2016 | Trau | |

OTHER PUBLICATIONS

International Search Report, International Patent Application No. PCT/US2017/061794, dated Feb. 20, 2018 (14 pages).

Pena-Pereira, Francisco et al., "Advances in miniaturized UV-Vis spectrometric systems," Trends in Analytical Chemistry, 2011, vol. 30, No. 10, pp. 1637-1648 (2 pages).

* cited by examiner

PIPETTE TIP WITH INTEGRATED LIGHT GUIDES IN THE BODY AND METHOD OF SPECTROSCOPIC ANALYSIS USING SAME

CROSS REFERENCE TO RELATED APPLICATION(S)

This Application claims the benefit of U.S. Provisional Patent Application Ser. No. 62/422,441, filed Nov. 15, 2016, and this application is a Continuation-in-Part (CIP) of U.S. Utility patent application Ser. No. 15/113,648, filed Jul. 22, 2016 and currently pending, which is, in turn a § 317 U.S. National Phase of International Application Serial No. PCT/US2015/012787 filed Jan. 23, 2015 and now expired, which in turn claims benefit of U.S. Provisional Application No. 61/930,684, filed Jan. 23, 2014. The entire disclosure of all the above documents is herein incorporated by reference.

BACKGROUND OF THE INVENTION

1. Field of the Invention

The present disclosure relates to disposable pipette tips that enable spectroscopic analysis of analytes within the tip and specifically disposable pipette tips that provide for an integral light guide to interface with a microspectrometer to provide spectroscopic analysis.

2. Description of Related Art

Almost all forms of chemical and biological research require the detection and quantification of specific analytes to understand and/or characterize the composition or phenomenon under study. Many types of methods have been applied to this detection ranging from the simple (for example, gravimetric) to the technically complex (for example, quantitative real-time RT-PCR or quantitative atomic force microscopy).

Analysis of the absorption, scattering, luminescence and fluorescence of light by a solute in solution (or a label on that solute) can enable the characterization of that solute. Spectrometers are utilized to measure the light or radiation altering properties of solutes or their surrogate analytes in solution for this purpose. Spectrophotometers or spectrometers can be multipurpose or designed and built for specific purposes. Multipurpose instruments have a common design mechanism as discussed below while those with specific purpose may have alternative components and potentially simplified formats. Specific purpose instruments are less common but are advantageous for differing reasons including expense, size, data quality, environmental factors, mobility, ease of use, and sample concerns. Often the multipurpose instruments, while providing flexibility, have reduced sensitivity than when compared to the single purpose instruments which have been optimized for a single purpose.

Standard multipurpose spectrophotometers require that the sample in question be obtained and then placed in a specific sampling cuvette which is then placed into the spectrophotometer directly in the path of a beam of light. A sensor is present in the light path downstream for detection of the light altering properties of the sample. The relationship of the light source, sample, and sensor is important for consistency of measured results. The light altering properties of the sample are typically compared against a reference sample (typically the same solvent without the target solute) to provide data regarding differences in light absorption, transmittance, scatter or emission. These differences are then associated with the solute of interest.

Given a relatively pure solute with a known light absorption extinction coefficient, it is possible to determine the concentration and purity of that solute in solution using a spectrophotometer and the procedure above. Because of this, spectrophotometers can be used in virtually any kind of analysis where identification, concentration, purity, or similar characteristics of a solute is required. The methodology, however, is not without its difficulties. There is a significant possibility for interference in more complex solutions or even due to the thermal energy supplied by the incident light beam. Because of this, spectrophotometers generally cannot measure in a vacuum and single measuring beam (single-beam) instruments effectively require manual subtraction of a reagent blank as described above to avoid solvent interactions or interactions from unintended solutes. To correct for temperature, light and other interferences a dual-beam approach was developed such that the sample with solute is run side by side with a sample without solute and subtracted in real-time to account for environmental and contaminant impacts.

One of the most common uses of spectrophotometers are for the determination of solute concentration in solution and they are very common in determining the concentration of certain biological components, often which have been tagged with markers specifically designed to assist in spectrophotometry. For example, measuring the absorbance of light by a sample at 260 nm ($A_{260}$) can determine the concentration of nucleic acids in the sample solution after extraction of those nucleic acids from biological samples. However, the presence of contaminant molecules such as protein, guanidinium salts, and phenol in a sample can increase the $A_{260}$ absorbance as well and this can provide an inaccurate reading. As these are common contaminants from nucleic acid preparations, they originally needed to be removed before accurate measurements of the extracted nucleic acids could be relied upon.

These same contaminant compounds, however, also absorb light at other wavelengths which light are not strongly absorbed by nucleic acids. Specifically, protein has a peak absorbance at 280 nm while phenol and guanidinium salts absorb strongly at 230 nm. Thus, by comparing the absorption ratio at multiple wavelengths it is possible to determine the level of contamination by these compounds without having to remove them from a sample. Routinely, $A_{260:280}$ ratios are used to determine the level of protein contamination in a sample while $A_{260:230}$ ratios are used to determine the contamination due to either guanidinium salts or phenolic compounds. Further processing can reduce the contamination and this can be further confirmed by repeating the optical measurements. For these applications, the relationship of the light source, sample, and sensor must again be consistent amongst samples to obtaining reliable results.

Colorimetric assays are designed for indirect detection of a substance in solution. The target substance may be a chemical compound, enzyme, or unknown mixture of compounds. Colorimetric assays involve chemical or physical reactions that involve a substrate/enzyme or target/ligand of interest. The result of this chemical reaction is the production of a compound or complex that has altered light/radiation absorbing/emitting properties at a specific wavelength. Ideally the change in light properties is linear in response to the concentration of the specific substrate of interest within a useful range of substrate concentration. Some examples include the use of ferrozine to measure iron atoms, Coomassie blue for protein, and para-nitrophenyl-phosphate for phosphatase activity.

Using a spectrofluorometer, it is also possible to detect the fluorescent emission of light from a fluorescent solute substrate or a fluorescently labeled solute for various purposes. Fluorescent spectroscopy can be linked to enzyme assays, studies of photosynthetic activity, cell enumeration, and various other fluorescence-based assays. Fluorescent probes and substrates have expanded the potential for sensitive detection of analytes of interest and generated a broad industry focused on its exploitation.

A specialized industry has developed about the use of luminescent assays which are at their core spectroscopy. However, in luminescent assays an enzyme/substrate pair are used to study analytes by generation of light within the sample and using the illuminometer (the reading spectrometer) to record the light levels. Advances in luminescent assays are even able to now produce multiple colors of light to allow multiplexed assays and more complexity within a specific sample to be studied.

In general, as described above, spectrophotometers used in most research are large and complex instruments designed for benchtop use as they often need to produce light at specific wavelength bands and detect absorbance of such light. These instruments are applicable in the chemical or biological laboratories for basic research, clinical diagnostics, biotechnology, chemical, and pharmaceutical industries, military applications, homeland security, and forensics laboratory settings where space is not at a premium and the size and bulk of a machine is a far less important consideration than its effectiveness. However, the instruments are too bulky to be mobile as they are often attached directly to a computer to drive the instrument and extract or analyze data.

In general, a focus on miniaturization in spectroscopy has thus occurred since the ability to perform microscopy quickly, easily, cheaply, and in situ allows spectroscopy to be used in more places. This miniaturization has taken two general forms, a decrease the instrument size (instrument miniaturization) and a decrease in sample size (assay miniaturization). Instrument miniaturization generally allows for the instrument to be more portable while assay miniaturization allows for the use of spectroscopy to detect the presence of small concentrations of materials without need to concentrate them.

The path length of standard cuvettes is 1 centimeter and, thus, filing a cuvette typically requires comparatively significant volume of the sample for analysis. Because of this, it is often necessary to prepare a sample to concentrate an analyte of interest to make sure that it is sufficiently detectable when the sample is placed in the solvent at this volume. Similarly, particularly high percentage samples may need to be diluted. Instrument miniaturization has allowed for smaller devices to be provided, but these devices are generally still designed for benchtop use and are designed for specific purposes. For example, the single purpose NANO-DROP spectrophotometer provides a smaller machine than standard spectrophotometers and uses a very small sample. However, it is not easily portable and is really only useable for specific types of analysis.

Miniaturized spectrophotometers have been developed previously. However, they have met with little success and were not accepted broadly as useful reliable instruments. An early device of Paul Hoogestater is provided in U.S. Design Pat. D237,982, the entire disclosure of which is herein incorporated by reference, developed a battery operated single channel spectrophotometer for field use. This device presumably used an incandescent bulb and simple photo sensor positioned on each side of the 1 cm cuvette sample port with an analog output for absorbance or transmittance. This may have been useful to measure samples like culture density and water sample clarity, but it would not have the accuracy necessary for molecular techniques to measure nucleic acid quality or abundance, nor would it work for fluorescence or luminescence. Further, it still required transfer of the sample to a cuvette for readings.

Several other miniature spectrometers have been pursued having applications with different targets and such do not incorporate many of the functional units described here in one instrument. For instance, a spectrometer proposed by Ciaccia et al in PCT Patent Application WO 2000/014,496, the entire disclosure of which is herein incorporated by reference, utilizes a PCMCIA card attached to a laptop to drive an illumination source and detector. This instrument is tied directly to a computer and thus has less mobility and greater expense associated with the instrument. Jung et al in PCT Patent Application WO 2003/073,457, the entire disclosure of which is herein incorporated by reference, describes an instrument utilizing LED illumination and photodiode detection in a device designed to analyze teeth surfaces. This device does not have a sample holder, luminescence or fluorescence capability, or wireless connectivity, and is wired to a computer for data transfer and analysis. Such a device provides little mobility and is unsuitable for measuring all but specific samples related to teeth. A spectrometer developed by Crowley et al in PCT Patent Application WO 1998/022,805, the entire disclosure of which is herein incorporated by reference, again is not suitable for measurement of liquid samples in a sample port with defined light path as it demonstrates a probe that would be inserted into a patient's body for direct analysis of targeted tissues.

Ultimately, the current problems with spectrophotometry can be summed up as follows. Multi-purpose spectrophotometers have generally been bulky laboratory based devices. While they provide for very useful analysis, their physical bulk, and need for a relatively large sample size, has meant that they are only useable when samples can be prepared specifically for them. Thus, it has generally not been possible to perform spectrophotometry on particularly small samples across a wide range of analytes of interest, and it has generally not be possible to perform such spectrophotometry on samples which are not prepared and analyzed in a laboratory for the spectrophotometer. Thus, the spectrophotometer has been a device which could be very useful in a variety of settings, but is confined to specific laboratory testing.

Therefore, what is needed is a portable and adaptable spectrometer with sufficient limits of detection to successfully compete with the more bulky and immobile laboratory grade devices, while still being sufficiently mobile and utilizing a relatively small sample to be useable in a variety of settings.

SUMMARY OF THE INVENTION

Described herein, among other things, are systems and methods for disposable pipette tips that enable spectroscopic analysis of analytes held within the tip while attached to a microspectrometer. A microspectrometer is a micropipette with the functional capability to irradiate an attached tip with light of a defined wavelength and measure the impact of the sample within the tip on the irradiated light as the modified light is directed back to sensors on or within the instrument.

There are described herein, among other things, a pipette tip comprising: a top portion for interconnecting said pipette tip to a barrel of a microspectrometer; a middle portion including a light guide and a sample chamber; a lower portion including a hollow internal volume interconnecting with said sample chamber; wherein said light guide is configured to direct input light along a vector from said microspectrometer through said sample chamber and back to said microspectrometer, said light changing direction at least twice to return to said microspectrometer along a vector in opposing direction to said vector of said input light.

In an embodiment of the pipette tip, the middle portion is generally in the shape of a conical frustum.

In an embodiment of the pipette tip, the conical frustum has a non-circular cross sectional shape.

In an embodiment of the pipette tip, the cross sectional shape of said conical frustum is in the form of two generally half circles connected by two opposing generally parallel lines.

In an embodiment of the pipette tip, the sample chamber has a non-circular cross sectional shape.

In an embodiment of the pipette tip, the cross sectional shape of said sample chamber is in the form of two generally half circles connected by two opposing generally parallel lines.

In an embodiment of the pipette tip, the top portion is generally in the shape of a conical frustum.

In an embodiment of the pipette tip, the conical frustum has a non-circular cross sectional shape.

In an embodiment of the pipette tip, the cross sectional shape of said conical frustum is in the form of two generally half circles connected by two opposing generally parallel lines.

In an embodiment of the pipette tip, the lower portion is elongated relative to said middle portion.

There is also described herein, in an embodiment, a pipette tip comprising: a top portion for interconnecting said pipette tip to a barrel of a microspectrometer; a middle portion including a light guide; a lower portion including a sampling chamber; wherein said light guide is configured to direct input light along a vector from said microspectrometer through said sample chamber and back to said microspectrometer, said light changing direction at least twice to return to said microspectrometer along a vector in opposing direction to said vector of said input light.

In an embodiment of the pipette tip, the middle portion is generally in the shape of a conical frustum.

In an embodiment of the pipette tip, the lower portion is generally rounded at an extreme end, said light internally reflecting from said rounding into said sample chamber.

In an embodiment of the pipette tip, the pipette tip is formed from two halves, each of said halves including generally half of each of said portions, bonded together In an embodiment of the pipette tip, the bonding is ultrasonic welding.

In an embodiment of the pipette tip, the halves are molded as strip containing a plurality of said halves.

There is also described herein, a pipette tip comprising: a top portion for interconnecting said pipette tip to a barrel of a microspectrometer; a bottom portion comprising two light guide arms separated by a sample region at a terminal end spaced from said top portion; wherein said light guide arms are configured to direct input light along a vector from said microspectrometer through said sample region and back to said microspectrometer, said light changing direction at least twice to return to said microspectrometer along a different arm from an arm guiding said input light to said sample region.

BRIEF DESCRIPTION OF THE DRAWINGS

FIG. 1 shows a perspective view, FIG. 2 shows a front view, FIG. 3 shows a top view, and FIG. 4 shows a side view.

FIG. 8A shows a perspective view, FIG. 8B shows a front view, and FIG. 8C shows a side view.

FIG. 12A shows a rear view of a half tip of FIG. 7 and FIG. 12B shows a detail of the end of tip.

FIGS. 13A and 13B show a perspective view and front view respectively of a first alternative tip, FIGS. 14A and 14B show a perspective view and front view respectively of a second alternative tip, and FIGS. 15A and 15B show a perspective view and front view respectively of a third alternative tip.

DESCRIPTION OF THE PREFERRED EMBODIMENT(S)

Figure 1:
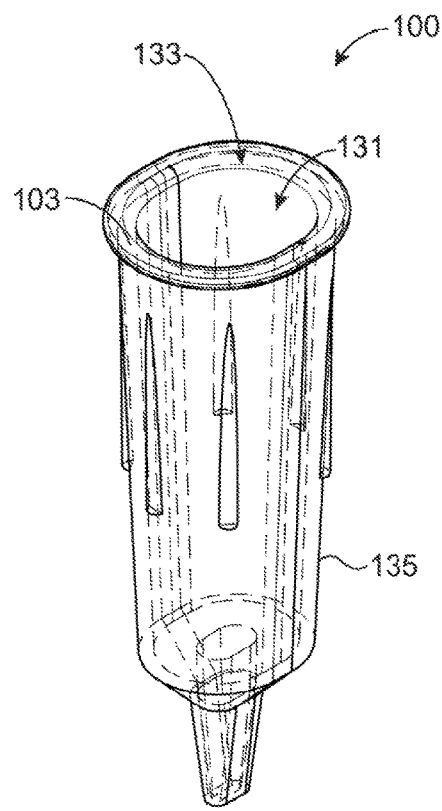
FIGS. 1-4 provide four views of an embodiment of a disposable microspectrometer tip as described herein.
Figure 2:
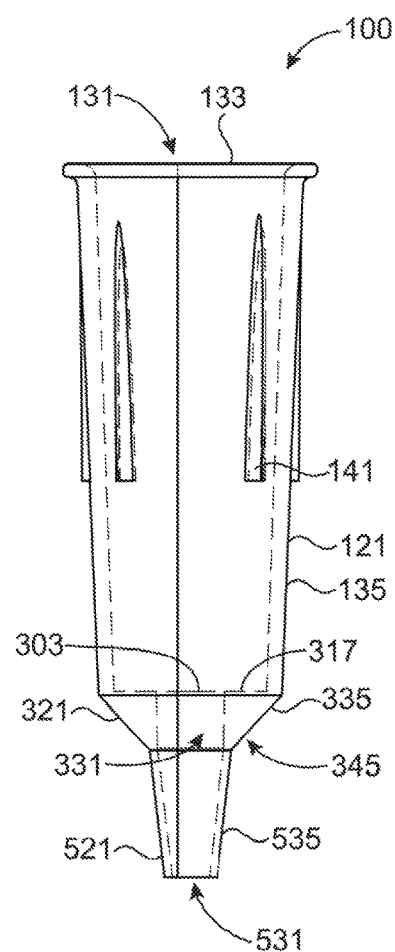

The present invention relates to novel disposable pipette tips that enable spectroscopic analysis of analytes held within the tip while attached to a microspectrometer. A microspectrometer is a micropipette with the functional capability to irradiate an attached tip with light of at least one defined wavelength (or wavelength band) and measure the absorption of the light (or other characteristic) by the sample within the tip as the modified light is directed back to sensors on or within the microspectrometer.

PCT Patent Application Serial No. PCT/US2015/012787 and U.S. Utility patent application Ser. No. 15/113,648, the entire disclosure of both of which is herein incorporated by reference, generally describe the design of a microspectrometer with pipetting capability and its disposable component tips for use in laboratories and in the field. The instrument is lightweight, portable, and capable of data display and or transmission to other electronic devices. In the above referenced documents, the described tips have design features that ensure attachment to the instrument, alignment with the optics, and allow samples to be drawn within and positioned within the light path of the instrument. For purposes of this disclosure, when this disclosure refers to a "microspectrometer" it will generally be referring to a device such as one constructed in accordance with the teaching of the above referenced patent documents and this includes both microspectrometers and microspectrophotometers. However, it should be recognized that the tips described herein may be useable with other types of devices as would be understood by one of ordinary skill in the art.

This disclosure provides various alternate designs of pipette tips for use with a microspectrometer such as that discussed above. However, the pipettes contemplated herein generally add design features of the tip that enable the tip to alter the light path of the microspectrometer by directing it to a sample that is not positioned immediately between the light source and the detector within the instrument, but through a sample within the tip. This light direction is accomplished through the use of internal reflection within the body of the tip. Essentially the body of the tip includes structures to enable it to act as a light guide. The advantage of redirecting the light path into the tip is that it allows the manufacture of tips through existing technology at low costs while reducing the minimum sample volume requirements needed for measurement.

Two different embodiments of pipette tips (100) and (200) utilizing an internal sample are provided in FIGS. 1-7 and 8-12B. These pipette tips (100) and (200) are different from traditional pipette tips in that tips (100) and (200) are used to draw up a sample and direct light from a microspectrometer (600) through a sample held within the body of the tip (100) and (200). This is achieved by making the walls of the pipette tip (100) and (200) act as a light guide. These tips (100) and (200), thus, alter the light path from the microspectrometer (600) directing it to pass through a sample held within the tip (100) or (200) and back to the microspectrometer (600) for detection.

The tips (100) and (200) are generally constructed utilizing transparent walls (135), (335) and (535) which allow for light to pass through the material and with a hollow internal volume (131), (331), and (531) and are designed such that light entering the walls of the tip (100) or (200) (or more particularly a portion of it) from a microspectrometer (600) is redirected using internal reflection toward and back from a sample chamber (331) which is within the tip (100) and (200). Any modification of the light caused by the interaction of the light with the sample can then be detected, recorded, and displayed by the microspectrometer (600). One advantage of this design is that it eliminates the need for the sample to be placed directly in between the light source and detector within the body of a spectrophotometer (600). It also has the advantage that it reduces the minimal required volume of sample necessary for a spectrophotometer (600) to the amount which can fill a pipette sample chamber. For example, in an embodiment of tip (100) of standard size, one microliter will commonly be sufficient for analysis. In another embodiment where the tip (200) is rounded off rather than cone shaped, the volume may be substantially less than 1 mm. In many cases, the sample can also be recovered after spectroscopic analysis without contamination and can be used for additional purposes.

Figure 5:
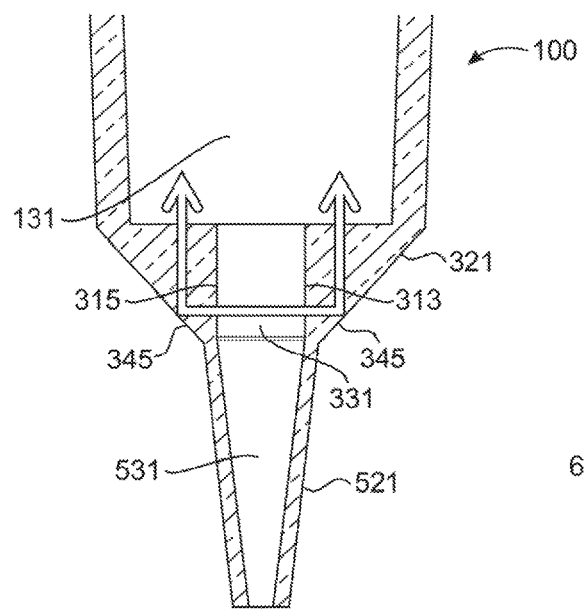
FIG. 5 shows a general indication of how light can be directed through the tip of FIGS. 1-4.
Figure 6:
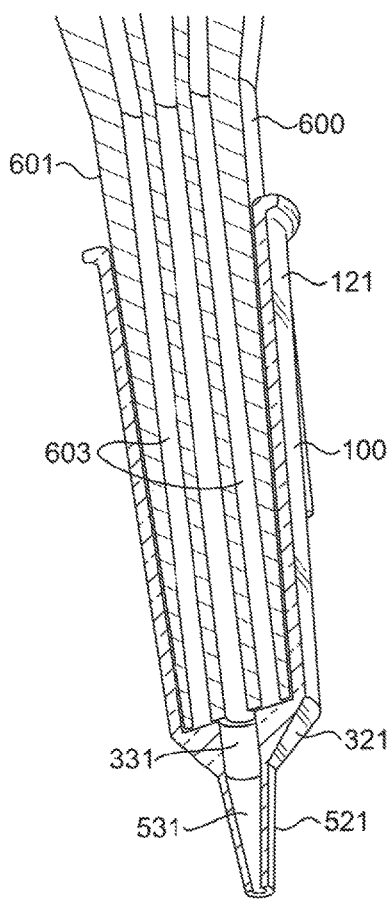
FIG. 6 shows a cross section of the tip of FIGS. 1-4 showing alignment of the channels for the light guides in the pipette barrel to the tip.

In a first embodiment shown in FIGS. 1-4, the tip (100) includes a generally narrow sampling port formed in the bottom portion (521), a sampling chamber in the middle portion (321), and the pipette barrel attachment and aligning walls in the top portion (121). Light from the pipette barrel connector (601) of the microspectrometer (600) (as shown in FIGS. 5 and 6) is projected onto the flat top surfaces (317) of the optical guide region which is within the middle portion (321). Light generally enters the walls (335) from one of the optical channels (603) in the microspectrometer (600), internally reflects within the walls (335), is directed across the sample chamber (331) and back into the walls (335) on the other side of the sample chamber (331). There, it is again internally reflected within the walls (335) and directed back out of the walls (335) through the flat top surface (317) where it re-enters the other of the optical channels (603) in the microspectrometer (601).

When viewed from the side or front, the tip (100) is generally comprised of three functional components arranged in a vertical manner corresponding to the three functional elements discussed above which are referred to as the top portion (121), middle portion (321), and bottom portion (521). The larger top portion (121) is generally used to attach the tip (100) to a microspectrometer (500) as shown in FIG. 6. This top portion (121) is of generally elongated shape having a generally continuous external wall (135) enclosing a hollow volume (131). The external wall (135) will commonly be formed of transparent or translucent material for ease of manufacture, but this is by no means required. The external wall typically will generally include a taper with decreasing perimeter size from the top opening (103) to the flat surface (317) interconnecting with the middle portion (321) of the tip (100). The top portion (121) may include one or more ribs (141) which are on the external surface of the external wall (135) and provide a structure for support when packaged in a common pipette tip box. The ribs (141) in the depicted embodiment are vertically oriented but that is by no means required.

Figure 3:
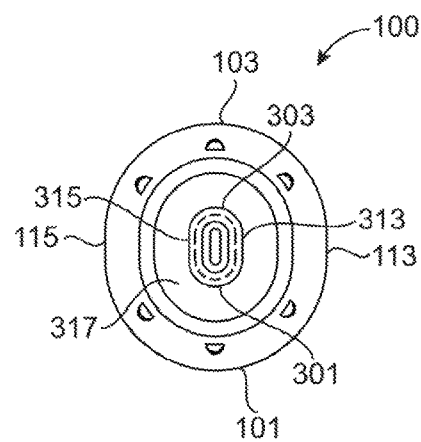
Figure 4:
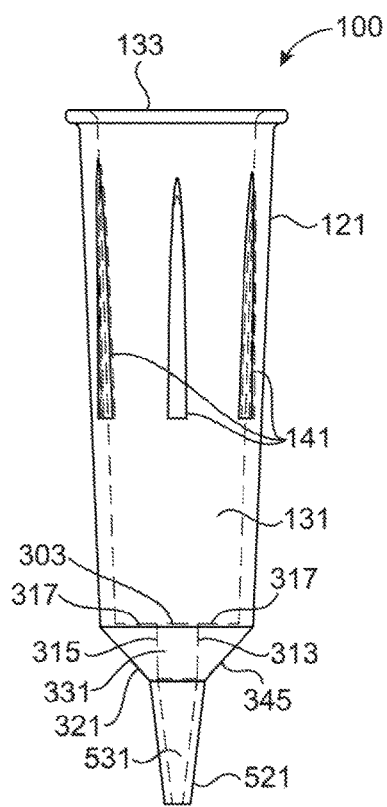

In the depicted embodiment of FIGS. 1-5, the top portion (121) of the tip (100) has a generally oval or "racetrack" cross-section when viewed from above as can be best seen in FIGS. 1 and 3. The cross-section in FIG. 3 provide for two opposing generally parallel planar surfaces provides for two rounded ends (101) and (103) which are generally semi-circular and are interconnected by two generally linear side faces (113) and (115). In alternative embodiments, the top portion (121) will be circular, ovular, ellipsoidal, or any other shape in cross section. The element of its cross section will generally be selected so as to provide frictional engagement with the barrel (601) of the microspectrometer (600).

Generally, the tip (100) will be connected to the microspectrometer (600) with the tapered barrel (601) of the microspectrometer (600) being inserted into the hollow volume (131) of the tip (100) via the top opening (133). The barrel (601) will generally have a similar cross sectional shape as the tip (100) providing that the tip will generally self align with the barrel (601). As discussed in more detail below, as it is preferred that the light channels (603) be aligned so light is reflected through the opposing parallel faces (313) and (315), a self-aligning design is generally preferred.

The second portion (321) of the tip (100) acts as a light guide for directing light into the sample and returning light from the sample to the microspectrometer (600). The second portion (321) is generally in the shape of an inverted conical frustum. The walls (335) of the frustum surround a generally tubular sample chamber (331) forming a hollow center through the frustum. As can be best seen in FIGS. 2 and 4, the sample chamber (331) will generally have an internal circumference which is substantially less than the circumference of the lowest portion of top portion (121). This creates a generally flat face (317) forming a partial base of the top portion (121) with the top (303) opening of the sample chamber (331) being positioned generally in the center of this base (317).

As previously indicated, the structure of the second portion (321) of the tip (100) provides the means to redirect light from the microspectrometer (600) across the sample chamber (331) and back to the microspectrometer (600). This redirection is achieved through the use of internal reflection on smooth surfaces formed in the walls (335) which are designed and positioned to redirect the light through the sample chamber (331). As such, the second portion (321) of the tip (100) acts as a light guide. To accomplish this, the walls (335) of the second portion (321) will be constructed of a material which is generally transparent, at least with regards to the wavelength(s) of light being utilized in conjunction with the tip (100).

To preferably achieve a good light path through the sample, The sample chamber (331) is of a hollow tubular shape have at least two opposing generally flat walls (313) and (315) positioned in a generally plane parallel fashion. In the depicted embodiment, they are slightly tapered outward (slightly conical) to allow their manufacture through injection molding. The hollow space internal to the walls (335) is the sampling chamber (331). A sample is drawn up through the bottom portion (521) of the tip (100) and a portion of it is held in position within the sampling chamber (331) for analysis.

In some embodiments, the sampling chamber (331) may project upward into the top portion (through the surface (317)) to permit the positioning of a filter or other object to reduce exposure of the sample in the sample chamber (331) to outside air. The overall body shape of this second portion (321) is preferably reduced in size to reduce the volume (and particularly the diameter) of material the light will travel through. The short light path within the light guide part of the tip (100) permits the use of materials that are not 100% transparent to the measuring light but are sufficiently conductive to allow for light to pass through a relatively thin amount of sample.

The sample chamber (331) in the embodiment of FIGS. 1-4 is generally tubular in shape and has a cross section of similar shape to that of the top portion (121) but that is by no means required. The sample chamber (331) of the embodiment of FIGS. 1-4 is of loosely ovular or racetrack form comprising two half-circular ends (301) and (303) connected by two generally linear sides (313) and (315). As can be best seen in FIG. 3, the linearity of the side (313) and (315) may be enhanced over that of sides (113) and (115). This is generally to provide two opposing generally plane parallel surfaces which are used as the surfaces for supplying light to the sample chamber (331) and collecting light from the sample chamber (331). Light will pass through one side (313), through the sample in the sample chamber (331) and then will continue through the other side (315). To avoid distortion or reflection of light in this area, it is preferred that these surfaces be as planar and as parallel as possible given modern manufacturing techniques.

The sample chamber (331) generally does not have the clear taper present in the internal volume of the top portion (121) but may have some taper to allow for traditional manufacturing. It instead has generally flat walls (313) and (315) positioned in a generally plane parallel fashion however, the sample chamber (331) may be slightly tapered outward to allow manufacture through injection molding using side action draw pins.

The flat base (317) will generally provide for alignment of the sample chamber (331) to the microspectrometer (600). As can be best seen in FIG. 6, when the barrel (601) of the microspectrometer (600) is placed in the top portion (121), the cross sectional shape will force alignment of the light channels (603) in the microspectrometer (600) with the portion of the flat base (317) which is adjacent the sides (313) and (315) of the sample chamber (331). The barrel (601) will also generally fit snuggly against the flat base (313) providing for little to no gap between the base (317) and the end of the barrel (601).

In FIG. 6, the cross section of the barrel (601) of a microspectrometer (600) is shown inserted and properly seated within an embodiment of a tip (100) corresponding to that of FIGS. 1-4. In FIGS. 5 and 6 the channels for light (603) included within the barrel (601) of the microspectrometer (600) that transfer light from a light source to the tip (100) and from the tip (100) to a detector are included. The light in this path will pass through the sample chamber (331) which is expected to be holding the sample. The light guiding portion of the tip (100) redirects light entering in a vertical orientation to a horizontal direction across the sample and then redirects it vertically to exit the tip (100) and enter the light channel (603) from the barrel (601) where it is directed.

This redirection is shown best in FIG. 5 and is caused by internal reflection within the walls (335) of the middle portion (321). As can be seen in FIG. 5, light can be directed by the light channel (603) on either side of the microspectrometer (600) down into the flat base (317). It is noted that the reason the two light channels (603) are referred to interchangeably is because the tip effectively is mirror imaged and therefore it does not matter on which side (313) or (315) the light source enters or leaves.

As the light leaving the channel (603) hits the flat base (317) at an essentially 90 degree angle to the face of the base (317), this light, as can be seen in FIG. 5, will continue into the transparent structure of the wall (335) with relatively little reflection until it hits the external surface (345) of the conical frustum. The angle of incidence of the light on this external surface (345) is generally around 45 degrees and that will result in the external surface (345) acting as a mirror and directing the light toward the wall (313) of the sample chamber via internal reflectance. As the light will contact the wall (313) at what is generally again around a 90 degree angle, the light will pass through the wall (313) with little reflectance and pass through the sample chamber (331).

Upon leaving the sample chamber (331), the light will hit the wall (315) again at a generally 90 degree angle passing through it with generally minimal reflectance. Again, the angle of incidence on the exterior surface (345) is angled relative to the face (315) such that the light is generally close to entirely internally reflected and directed back toward the flat base (317). As again the light intersects the face (317) at a virtually 90 degree angle, the light will pass back into the other light channel (603) of the microspectrometer (600) with generally little reflection. After entering the channel (603) the light can be collected and measured as understood by those of ordinary skill in the art. As should be apparent from FIG. 5, either light channel (603) in the microspectrometer (600) can be the source of the light and the other can act as the collector.

The lower portion (521) of the tip (100) also generally has a rounded rectangular conical frustum shape with cross section corresponding generally to the cross section of the top (121) or middle portion (321). This is, however, done for ease of manufacturing and is by no means required. In alternative embodiments, the bottom portion (521) may have a more traditional circular conical frustum shape. The bottom portion (521) is generally elongated to allow it to extend into a microcentrifuge tube or other sample location to allow samples to be drawn from the bottom of a microcentrifuge tube or other sample source having a narrow access port.

Ideally, the lower portion (521) is not of particularly elongate shape as the internal volume of its hollow interior (531), in addition to the volume of the sample chamber (331), directly correlates with the sample volume that is necessary to perform spectroscopy. For many assays, it is known that minimizing necessary sample volume is desirable and this can be achieved by designing the hollow portions (531) and (331) of the two lower portions (321) and (521) of the tip (100) to be as short and narrow as reasonably possible. However, some length is still generally necessary to allow reaching into the bottom of the sample holder with which it could be commonly used. To improve this aspect of the design, it is also beneficial to reduce the external diameter of the top portion (121) of the tip (100) allowing it to fit within the sampling vessel without impediment even when placed on the barrel (601). This allows the tip (100) to be inserted as low as necessary into the sample holder (which is usually a microcentrifuge tube).

To test a sample, the sample is drawn up through the lower portion (521) of the tip (100) and a portion is held in position within the sampling chamber (331) for analysis. Analysis is performed, and then the sample can be discarded in an embodiment. Alternatively, as the microspectrometer (600) can be used for pipetting transfer of sample as is well known to those of ordinary skill in the art, the sample may also have spectroscopic analysis performed while utilizing the microspectrometer to transfer the sample to another location. As such, the system allows for a very small sample size to be analyzed effectively in transport between two other necessary locations of that sample.

In an embodiment, the sample chamber (331) dimensions may be optimized for optical path lengths (the distance between faces (313) and (315)) between 0.1 and 10 mm. Shorter path lengths are ideal for small sample volumes and for sampling concentrated analytes without dilution. Longer path lengths are ideal for cases like measuring cell density where a 1 cm path length is standard and there is little concern for sample volume.

While the above has shown a tip (100) which utilizes a small volume of analyte for spectroscopic analysis in transit between other vessels, FIGS. 7-12B provide for another embodiment of a tip (200) which is useable on a very small sample. In the tip (200) of this embodiment, the middle portion (321) is greatly elongated and externally tapered and the bottom portion (521) is extremely short. However, the light guide element of the prior middle portion (321) is now positioned within the bottom portion (521). This provides for a middle portion (321) which acts as an elongated light guide directing the light from the microspectrometer (600) toward the bottom portion (521) which is shaped to act as the middle portion (321) of the prior embodiment. Thus, the light is only reflected at the extreme end (703) through the hollow sampling chamber (331).

Figure 12A:
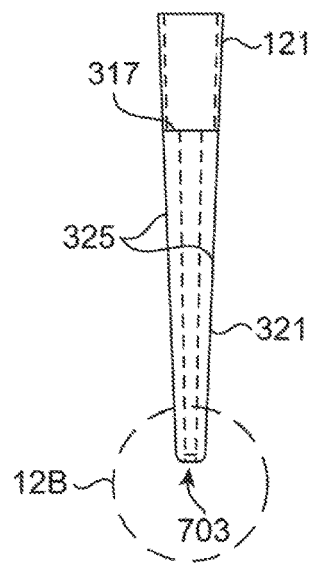
FIGS. 12A and 12B show details of the light guides through a half tip of FIG. 7.
Figure 12B:
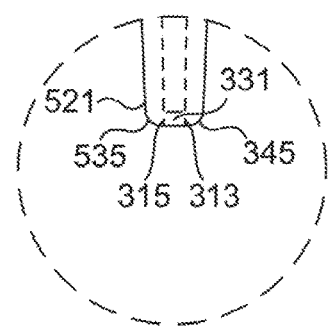
Figure 13A:
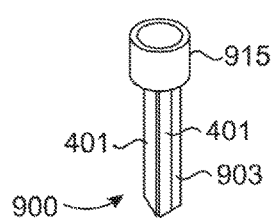
FIGS. 13A, 13B, 14A, 14B, 15A and 15B show various views of alternative tips which do not draw a sample but are submerged in a sample.
Figure 13B:
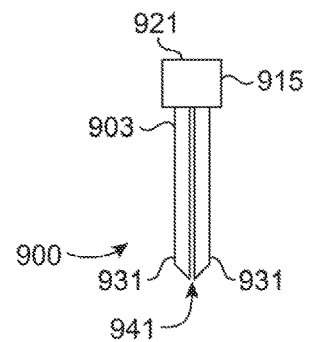
Figure 14A:
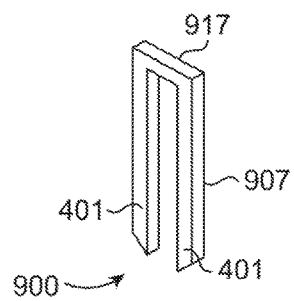
Figure 14B:
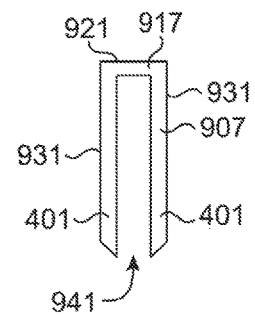

As can be best seen in FIGS. 12A and 12B this embodiment uses a internal elongated light guide formed form the walls (335) of the middle portion (321) to reduce the sample volume needed for measurement when light transmission efficiency is not a concern by placing the sample chamber (331) at the extreme end (703) of the tip (200). Light from the microspectrometer (600) barrel (601) is projected onto/into the horizontal surface (317) inside the tip (200). It then is reflected within the walls (335) and eventually into the chamfered region at the base (703) where interaction with the external surface (345) directs the light into the sampling chamber (331) and back into the walls (335) where is it is again reflected and transported to exit the tip (200) at surface (317) and enter the light channel (603). In this embodiment, the sample only needs to be drawn up past the lowest portion (521) allowing use of an extremely small sample.

In FIG. 12A, there is a front view of a filleted design which shows a single tip (200) with a filleted shape lower portion (521) of the tip (200) as can be seen in the magnified view of FIG. 12B. A rounded end (703) on the lower portion (521) may result in more complicated light reflection than the conical frustum of FIGS. 1-5, but will concentrate the light at the tip (703) so more will pass through the sample and do so generally in a more narrow beam. This reduces the amount of sample required to adequately measure its optical properties. This could be further optimized using a parabolic curve or other curves in the lower portion (521) which are designed to improve internal light reflection toward the sample chamber (331).

In the embodiment of FIGS. 12A and 12B, the design the tip (200) may include an upper chamfer with around 3% draft to allow injection molding using a side action pin. The lower chamfered region has a complimentary about 42% draft to direct the light 90 degrees from the original path of light from the instrument. The light then passes through the sample and turns another 90 degrees toward the microspectrometer (600).

Figure 7:
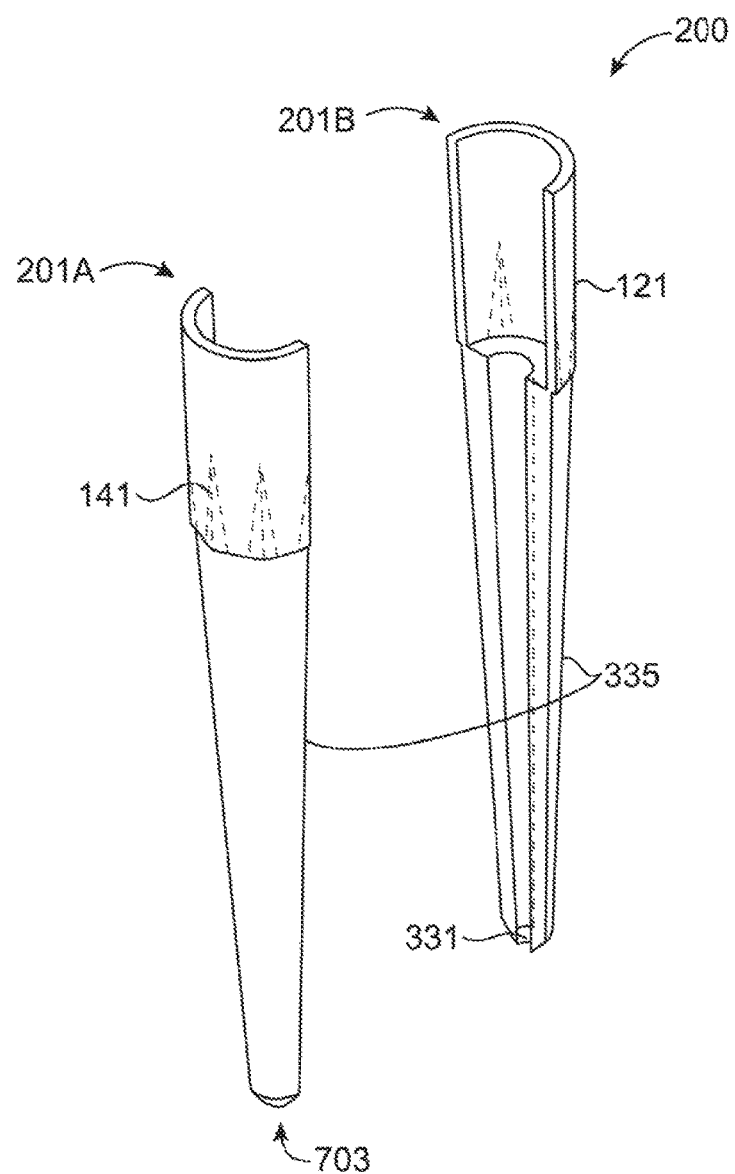
FIG. 7 shows an alternative embodiment of a disposable microspectrometer tip which uses an elongated guide to reduce necessary sample volume.
Figure 8A:
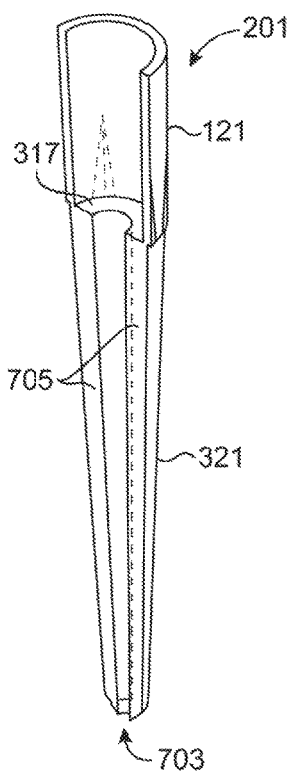
FIGS. 8A, 8B, and 8C show various views of each half tip of FIG. 7.
Figure 8B:
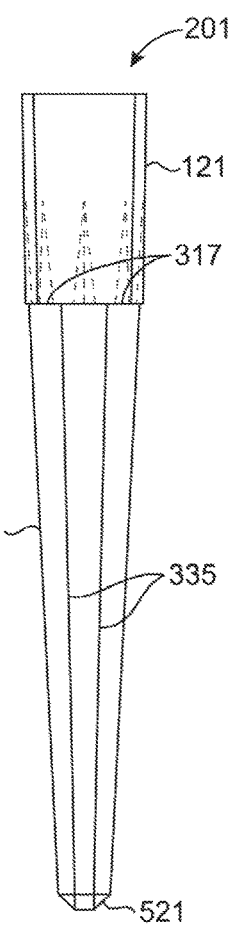
Figure 8C:
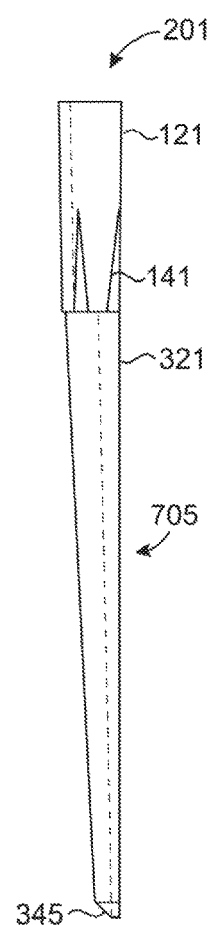

As can be seen in FIG. 7, in order to provide for ease of manufacture of the tip (200), the tip (200) may be molded using two identical halves (201A) and (201B) in a manner such that two halves (201) can be joined later through sealing compounds, sonic welding, or over molding or in any manner to join two parts together. Note that while this modeling is contemplated with the embodiment of tip (200) shown in FIG. 12, this molding method may also be used on tip (100) of FIG. 1-5. Molding the tips (200) in halves (201) eases mold design reducing side action pins, which are easily damaged and expensive to maintain. FIGS. 8A, 8B and 8C show various additional views of the two molded halves (201) which may be used in FIG. 7. It should be recognized that the half (201) is used as both halves (201A) and (201B) in the embodiment of the FIG. 7 as the two halves (201A) and (201B) are identical parts for all intents and purposed. In an embodiment, the two halves (201A) and (201B) may actually be essentially identical parts made from the same mold cavity as contemplated herein, or may be nearly identical parts with differences resulting from modifications to the mating faces (705) to allow for joining the two pieces. For example, the mating faces (705) may comprise corresponding male and female connectors to allow for more secure and aligned connection.

Molding the tips (200) in two halves (201) instead of just one provides opportunities to make significant changes to the central geometry of the tip (200) that cannot be made using side action pin molding. For example, the overall geometry of the hollow center core and particularly the sample chamber (331) is no longer limited to the draft and pulling action of the central core pin. This means a thinner core can be made to reduce the light path of the sample and to reduce the total sample volume required. The extra cost associated with a second round of processing (for example, sonic welding after injection molding) can be offset by making more than one tip (200) at a time by automated sonic welding, and by reducing the initial cost and maintenance of the mold to make the tips (200). While it is considered here that the tips (200) can be molded in two halves (201) and then sonic welded together, it is not required. The tips (200) can still be made in the fashion of traditional single pipette tips or in multi-unit strips using side action pins to create the internal hollow cavity.

As should be apparent, the existence of the line of connection between the two halves (201) where the faces (705) meet is irrelevant to the light transmission as the light only passes the plane connecting the two halves as it passes through the sample chamber (331). Instead, the light associated with each light channel (603) is generally only within a single half (201). That is, in FIGS. 5 and 6, the depicted cross section of the tip (100) or (200) would be cut through the two halves (201A) and (201B) such that the line (plane) of connection between the faces (705) would be visible in the center of FIG. 5 (perpendicular to the page). At this point, the light is external to the wall structure (335) of each half (it is within the hollow sample chamber (331) enclosed within them) and thus the light never passes through the plane of faces (705).

In the depicted embodiments, the two-halve molded tips (200) are generally rounded in cross section as the placement of the sample chamber (331) at the extreme end (703) and utilizing a rounded tip end (705) generally means that the planar faces (313) and (315) are not necessary. However, half molding is not limited to only rounded tips and may be used on any embodiment of tips (100) or (200). The same rounded rectangular shape described for tips (100) in FIGS. 1-5 can also be split in halves for molding. In a similar manner, oval, triangular, hexagonal, octagonal, or other top down profiles can be utilized as necessary for optimal efficiency at directing the light to the sample and back to the detector and for connection to specific microspectrometers (600). Further, alternate shapes may also be preferred for packaging or storage of tips or alignment with the instrument and these can also be produced as would be understood by one of ordinary skill in the art.

Figure 9:
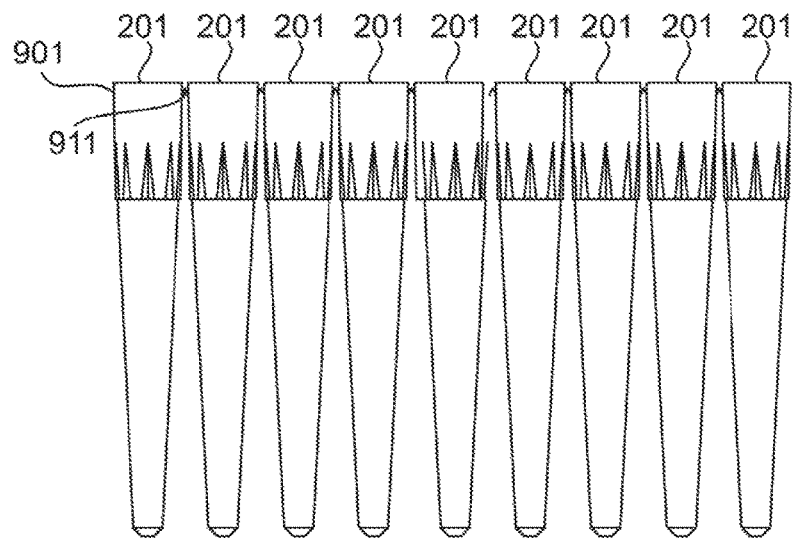
FIG. 9 shows a front view of a single molding comprising eight half tips of FIGS. 8A-8C.
Figure 10:
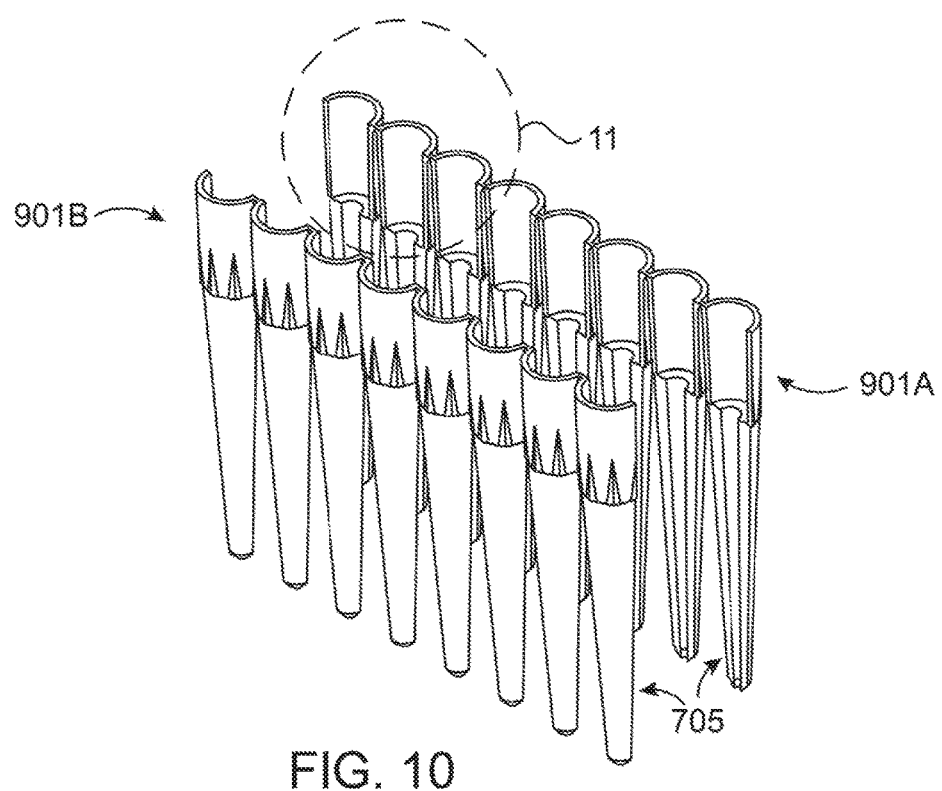
FIG. 10 shows how two moldings of FIG. 9 can be combined together.
Figure 11:
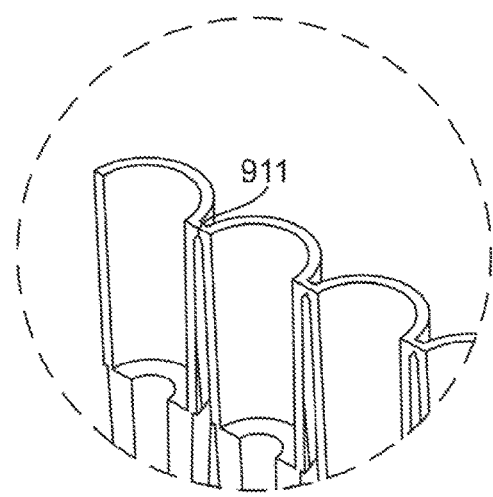
FIG. 11 shows a detail view of the breakable joint connecting the various half tips in the molding of FIG. 9 together.

FIGS. 9-10 illustrate an embodiment which allows for multiple tip halves (201) to be co-molded as one piece (901) to simplify manufacturing. Two strips (901A) and (901B) of halves (201) may then be connected together using adhesives or techniques such as sonic welding as known to the art and illustrated in FIG. 10. As can be seen in FIGS. 9 and 10 this form of molding provides for eight half tips (201) in a strip (901) to ease molding, and eliminating the need for side action inserts in the mold design. The eight tip halves (201) may be joined by an easily breakable connection (911) as best illustrated in the detail view of FIG. 11. Once assembled, tips (200) can then be separated by breaking the breakable connections (911) between each tip (200). This can be performed as part of manufacturing or can be performed at the time of use by an end user. Regardless, it allows for each tip (200) to be used one at a time.

In the embodiment of FIG. 9, The tip halves (201) may be molded together with a nine millimeter pitch (distance between two tip halves (201)) to allow tips formed from the entire strip (901) to be inserted into a standard 8×12 box as is common for pipette tips. Alternatively, tips (200) can be boxed, or packed and hermetically sealed in pouches. Tips (200) may be broken off one at a time for individual use or used intact with multichannel devices. It is also possible to reduce the pitch between joined tips (200) as desired. This can cause the tips (200) to break apart when inserted into standard tip boxes for packaging. In this way, they can be used by single channel or by multichannel instruments without the user needing to break the tips apart.

The above referenced images and text, refer to a standard pitch being preferred between tips (200). Currently, most pipette tips are packed in boxes using a nine-millimeter space or pitch between tips in a box in both orientations unless the holes or slots for the tips are offset to reduce the overall size of the box. This allows standardization for multichannel pipettes and for robotic processes. However, the use of these tips (100) or (200) is not limited to high throughput devices and may be used one tip (100) or (200) at a time. As such they may be packed in boxes other than the standard 8×12 conformation. Alternatively, they may be packaged in paper or plastic films similar to syringes or bandages. They may be packaged as single tips, or in packages of 4, 8, 10, 12, or any other number of tips commonly used in one setting/experiment/test and convenient for the user. They may or may not be sterile, protease or nuclease free. They can also be packed in bulk within bags or other containers.

Although eight half tips (201) are shown in FIG. 9 is would be well understood by those of ordinary skill that, it is possible to join any number of tips (200) during the manufacturing process. Multichannel pipettes commonly have eight or twelve barrels and it would make sense to follow that standard by providing strips with either 8 or 12 linked tips (200) once the two halves (901A) and (901B) are joined together. Although it is important to note that robotic instruments can vary in the number of barrels used and tips can be made joined or disjoined for those uses.

While the above have all focused on pipette tips (100) or (200) which allow for transport of the sample within the pipette tip (100) or (200), FIGS. 13A-15B provide for variable views of three embodiments of "pipette" tips (900) which utilize a light guide without a hollow core. These are useful for allowing the microspectrometer (600) used above to spectrographically analyze a sample, but without the need for the microspectrometer (600) to apply a positive or negative pressure to the sample to draw a sample into the sample chamber (331). Instead, the end of the tip (900) is submerged in the solution to be analyzed.

While the premise of the above description uses a body that in many ways resembles a standard pipette tip, a simple probe that is submerged in the sample may be preferable if there is no need to transfer the sample using the tip (900). In the embodiments of FIGS. 13A-15B, the tip (900) is more accurately described as a probe which is composed of two light guides (401) attached with a collar (915) or cross member (917) that serves to attach and align the tip (400) with the microspectrometer (600). The collar (915) or cross member (917) also is used to control the spacing between the two light guides (401) and defines the optical path length (941) which is the equivalent of the length across a sample chamber (331).

The tip (900) is attached to the microspectrometer (600) without contamination of the light guides (401) by potential contaminants by simply pressing the barrel (601) of the microspectrometer (600) onto the collar (915) in the same manner that the barrel (601) connects with the top portions (121) in prior embodiments. The light guides (401) are, at least in part, light transmitting to the wavelength of interest and direct light away from the microspectrometer (600) toward and across a sample located between the two arms (401). The light is again captured by the second light guide arm (401) and directed back up through internal reflection to the microspectrometer (600). In effect, the arms (401) of the embodiments of FIGS. 13A-15B represent the minimum structure for guiding light of the tip (200) as all remaining wall (335) and (535) structure has been removed. As the sample is not bounded on all sides by the wall (335), the sample region (941) is defined as the area between the two light guide arms (401) where light exits one light guide (401), passes through the sample region (941), and back into the second light guide (401).

The top portions (921) of the various tips (900) demonstrate two releasable mechanisms (915) and (917) for attaching to the device. Two tip (900) versions (903) and (905) rely on a tapered top portion collar (915) allowing a snug or snap fit collar common to pipette tips and which may be of similar design to the top portion (121) of the above discussed embodiments. The other embodiment (907) instead utilizes a cross member (917) that can be releaseably clamped by the microspectrometer itself. In all three embodiment (903), (905) and (907), Light guide legs (931) extend downward from the connector (915) or (917) and may be of various lengths appropriate to reach the solution in the bottom of a vessel based on the type of analysis they are intended for.

Figure 15A:
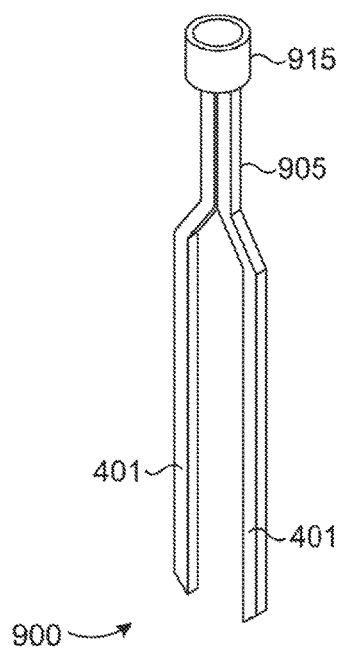
Figure 15B:
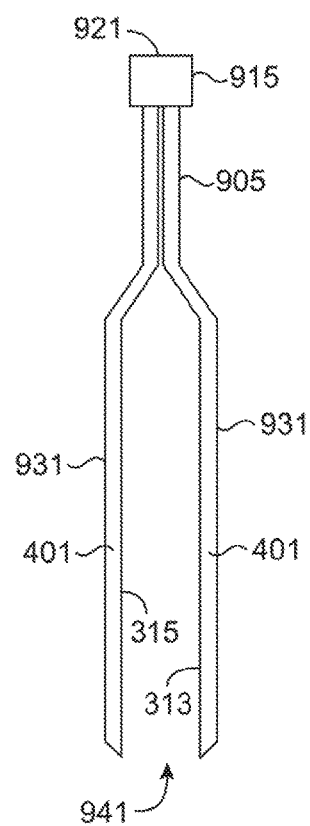

Shorter guides (903) and (907) such as shown in FIGS. 13A, 13B, 14A, and 14B will commonly be used for standard microcentrifuge tubes while longer guides (905) as shown in FIGS. 15A and 15B can be used for 15 ml microbial culture tubes or altered in length for any depth of vessel. In the embodiments of FIGS. 13A-15B, as the sample chamber (331) is eliminated and simply replaced by an open sample region (941) as there is no need to draw material from the current vessel into the tip (400). Instead, the sample region (941) which is preferably located at or near the base of the tip (400) and where light is directed between the two light guide legs (931) is simply submerged in the sample in whatever vessel currently contains it (or the sample may be placed between the arms (401) if the sample is solid).

The optical path length, which corresponds to the distance that the light guide arms (401) are apart, can be variable depending on the specific embodiment and intended use. For example, tip (903) may have a particularly small sample region (941) of about 0.5 mm while tips (905) and (907) may have a much longer sample region (941) such as about 5 mm to about 1 cm. These examples were chosen to demonstrate that a variety of path lengths can be created dependent on the needs of the assay performed, but are in no way required. Shorter path lengths would generally be preferred for concentrated solutions such a nucleic acid analysis. Longer path lengths such as 1 cm would be preferred to measure microbial cell density as that is the most commonly reported path length in the literature.

The light guides (401) can have square, rectangular, round or any cross section profile as necessary to deliver light to the sample region (941) and back to the microspectrometer (600). The light guides (401) can be molded or cut from any transparent material. The guides can be coated or over molded with material to reduce stray light from entering the light guide and/or to improve internal reflection. This coating may also be incorporated into the upper portion (921) used to attach and align the tip (900) with the microspectrometer (600). Alternatively, the collar (915) and/or coating may be molded separately and snapped over the arms (401), or sonic welded to or around the arms (401). The arms (401) can be made of plastic including polyethylene, polypropylene, cyclic olefin copolymer, acrylic, polycarbonate or mixtures there of and of various densities. The arms (401) can also be made of glass, quartz, or any other optically transparent material. A coating or covering sleeve can be made of plastic or other material that is not transparent to the wavelength of light of interest and may be sprayed on, brushed on, over molded, snapped on, sonic welded to or around, or applied by any means necessary to reduce or prevent stray light from entering the light guides or better constrain light within the waveguide arms (401). Alternatively, the probe material can be pigmented during manufacture to absorb wavelengths of light which are considered unfavorable to analysis of the analyte of interest.

The qualifier "generally" and similar qualifiers, as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally," and relationships contemplated herein regardless of the inclusion of such qualifiers, to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A pipette tip comprising:
a top portion for interconnecting said pipette tip to a barrel of a microspectrometer;
an elongated a middle portion including walls surrounding a hollow central core, said walls forming a light guide to internally reflect input light from said microspectrometer within said walls of said middle portion and into a bottom portion;
said bottom portion including a sample chamber at a terminal end thereof and a light guide element for directing light received from said light guide into said sample chamber;
wherein said light guide element directs said received light through said sample chamber, into an opposing side of said light guide element, and into said light guide, said light returning to said microspectrometer.

2. The pipette tip of claim 1 wherein said middle portion is generally in the shape of a conical frustum.

3. The pipette tip of claim 2 wherein said conical frustum has a non-circular cross sectional shape.

4. The pipette tip of claim 1 wherein said bottom portion is generally rounded at an extreme end, said light internally reflecting from said rounding into said sample chamber.

* * * * *